Figure 1:
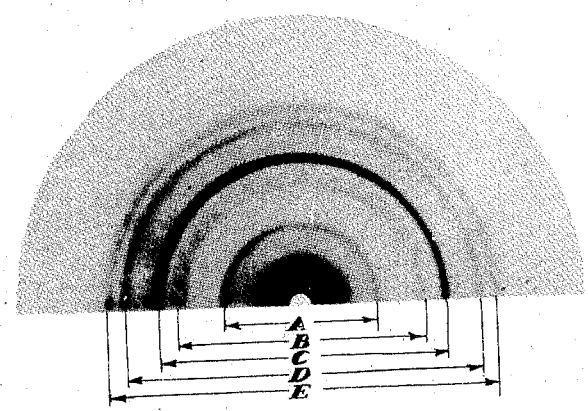

July 2, 1940.    G. R. McDANIEL    2,206,289

STABLE, HYDROUS, ALKALINE SILICATES

Original Filed July 2, 1936

INVENTOR.
George R. McDaniel
BY Wood & Wood
ATTORNEYS

Patented July 2, 1940

2,206,289

UNITED STATES PATENT OFFICE 2,206,289

STABLE, HYDROUS, ALKALINE SILICATES

George R. McDaniel, Cincinnati, Ohio, assignor to Diamond Alkali Company, Pittsburgh, Pa., a corporation of Delaware Original application July 2, 1936, Serial No. 88,645. Divided and this application August 8, 1938, Serial No. 223,675

4 Claims. (Cl. 23—110)

This invention relates to a new series of soluble sodium silicates. This application is a division in respect to my copending Patent No. 2,131,718, filed July 2, 1936 which issued on Sept. 27, 1938, for "Stable, hydrous, silicate and method of making same," in which the method of making these new products is described and claimed.

Silica is known to react with the alkali metals in a variety of different ways to form a variety of compounds. One of the oldest and most common of these forms is ordinary sodium silicate, which, commonly, in the past has been referred to as "waterglass". Sodium silicate and silicate of soda are the general names applied to the group of commercial materials composed of varying proportions of sodium oxide ($Na_2O$) and silicon dioxide ($SiO_2$), either as a solid or in water solution. The manufacture of sodium silicate is generally carried out by fusing a mixture of soda ash and sand at a red or white heat, although a number of other methods are known, such as high temperature fusion of sand and caustic soda, or a like fusion of sand, sodium sulfate and carbon. The waterglass is used extensively in industry for adhesive purposes, in paper making, in soap making, and in many other fields. In these commercial solutions of silicate, however, the ratio of $Na_2O$ to $SiO_2$ generally varies between one and one-half to four mols of silica to one mol of sodium oxide. The amount of sodium oxide is always less than the silica, and these materials, therefore, are only mildly alkaline.

More recently a variety of silicates which are more alkaline in character have been proposed for industrial purposes and some of these have met with considerable success. The most common of these materials is sodium metasilicate, $Na_2O.SiO_2$, which is comprised, as indicated by the formula, of one molecular part of the alkali metal oxide and one molecular part of silica. The metasilicate appears in a number of different forms, which differ from one another in the degree of hydration. Industrially, the pentahydrate ($Na_2SiO_3.5H_2O$), which melts in its own water of crystallization at a temperature of approximately 72° C., and which is produced by crystallization, from the liquor supercooled to a temperature somewhat below the 72° melting point, is most common. Metasilicates other than the pentahydrate, however, are provided by simple manipulations in the production technique. Thus, adjustments in the temperature at which crystallization is permitted to take place, and also adjustments in the amount of water present in the starting solution enable the production of the six hydrate ($Na_2SiO_3.6H_2O$), a material which melts around 62° C. and also metasilicates with 8 and 9 waters of crystallization. These materials melt at temperatures of about 49 and 47° C., respectively.

Still more recently, a composition which has been identified as sesquisilicate, (or pyrosilicate) also has been disclosed. In this material, one and a half molecular parts of $Na_2O$ are combined with one molecular part of silicon dioxide. The alkalinity of the sesqui or pyrosilicate is increased over that of the metasilicate, and likewise, the alkalinity is substantially increased over the alkalinity of waterglass.

Hydrated silicate substances of the type of sodium meta and sesquisilicate are peculiar in that they tend to exhibit the quality of instability. When a comminuted mass of impure metasilicate crystals, for example, is stored in an ordinary container or bottle over a period of time, the particles frequently are found to have become caked together and set up into a hard, solid mass, which it is relatively impossible to handle conveniently. It has been alleged that a cause of such caking or agglomeration is occasioned by the transfer of water from one crystal to another. It has also been alleged that caking and agglomeration are less likely to occur where all of the discrete particles are of the same composition, or exhibit the same vapor pressure. Improvements in the production technique have enabled the preparation of masses from which discrete particles, which are of the same composition, or of the same vapor pressure, can be obtained by grinding, and, as a general rule, the mildly alkaline crystalline silicates, commercially available at the present time, are not particularly unstable, yet the tendency toward instability is a difficulty encountered as soon as the preparation of more alkaline silicate substances is attempted.

Briefly, the products of the present invention are stable sodium silicate compositions, more alkaline than the meta or sesquisilicates and more specifically suited for use as detergents and cleaning aids and for like purposes where an abundance of alkalinity is required in the silicate. In general, these new products contain from approximately 1.75 to 2.25 molecular parts of sodium oxide to each molecular part of silica. They may be termed sodium orthosilicates, although this term is usually reserved to denote the particular composition in which exactly two parts of sodium oxide are combined with one part of silica.

These products are in the hydrated form and at the same time are characterized by their stability. In general, the products contain from approximately 5 to 7 molecules of water as water of hydration. This proportion of water facilitates the dissolution of the products in water. The products, therefore, can be characterized as stable, hydrous sodium silicates and the formula for them can be represented as $nR_2O.SiO_2xH_2O$ in which—

$n$ equals the value from about 1.75 up to and including about 2.25

$R_2O$ represents sodium oxide, and $xH_2O$ represents the number of molecules of water of crystallization in the general range of approximately 5–7

Figure 2:
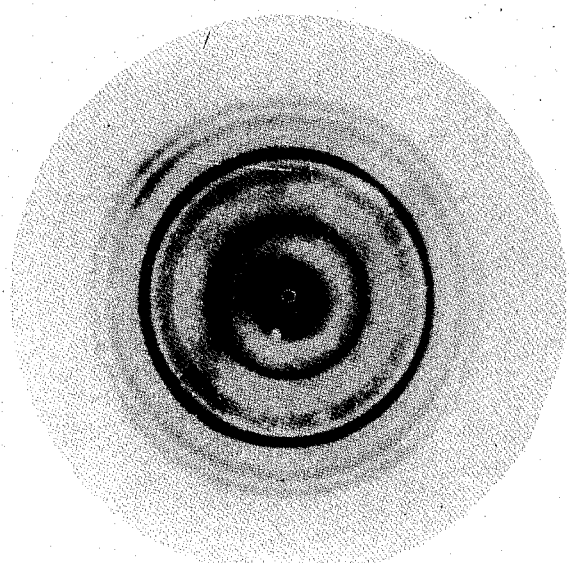

Each of the compositions of the present invention exhibits a characteristic diffraction pattern when subjected to X-rays according to the pin-hole method of Laue. This characteristic diffraction pattern is useful as a means for identifying the products of this invention and distinguishing them from other silicate substances. This characteristic X-ray diffraction pattern is illustrated in the drawing in Figure 1, which is a photolithograph of an X-ray photograph. Figure 2 is similar to Figure 1 except that only a half of the pattern is illustrated and the relative positions of the dominant rings of the pattern are dimensioned.

In order that the significance of these X-ray patterns and their utility may be understood, it is helpful to explain the method by which they are derived. A typical sample to be investigated, for example a thin flake, is mounted upon a platform and subjected to X-rays passing through a pin-hole upon emanation from an X-ray tube having a copper target, and operated at 35 KV (maximum on rectified current) and 20 milliamperes. No filter is used so that the $K_\alpha$ and $K_\beta$ radiations strike and pass through the sample. A stream of X-rays is directed through the specimen for a period of exposure of approximately 4 hours, with the specimen approximately 5 centimeters from the film. With the $K_\alpha$ wavelength of 1.54 A. and $K_\beta$ 1.38 A. the characteristic pattern displayed in the drawing at Figure 1 is obtained. For most purposes of comparison, the specimens are relatively thin and flat, though granules containing an aggregation of the minute crystals may be used if necessary.

The diffraction pattern illustrated in the drawing characterizes all of the products of the present invention. In this drawing Figure 2 illustrates the typical full ring patterns which are obtained photographically and in the half picture, Figure 1, the positions of these rings are dimensioned. Though the composition varies from 1.75 to 2.25 molecular parts sodium oxide to one molecular part silica, and though the water of crystallization also be varied, the diffraction patterns displayed by the different materials are the same, both as to intensity of rings and as to ring positions, when they are subjected in like manner to the X-rays according to the pin-hole method.

The innermost of the rings marked A has a relative diameter of 30+ units, the next marked B 49 units, the next marked C 57+ units, the next marked D 71 units and the outermost ring marked E has a diameter of 78 units. If the diameter of the outermost ring be taken as one or unity then the relative positions of the diffraction of the products of the present invention are as follows:

$E\ 78/78 = 1.0$ or $x$
$D\ 71/78 = .91$ or $.91x$
$C\ 57/78 = .73$ or $.73x$
$B\ 49/78 = .63$ or $.63x$
$A\ 30/78 = .39$ or $.39x$ $x$ being the diameter of the outermost dominant ring, as indicated.

At times there are certain very faint rings which appear in the diffraction patterns; these may be termed fugitive rings. One of them, for example, appears within the smallest dominant ring and is 23 units in diameter. Another appears just beyond the third dominant ring and is of 63 units in diameter. These fugitive rings do not appear in all of the ring patterns; sometimes they are too faint to be seen. However, when they do appear their presence is further identification of the products of this invention.

The precise measurement of the rings on a photograph is difficult and the measurements made by different operators may vary, perhaps, by plus or minus one unit, depending upon the sharpness of the photographic images.

Each of the products of the invention, therefore, when subjected to X-rays according to the pin-hole method of Laue, provides an X-ray diffraction pattern in which the outermost ring has a diameter $x$, the next a diameter $.91x$, the next a diameter $.73x$, the next a diameter of $.63x$ and the next a diameter of $.39x$.

The products of the invention are useful generally where alkali is required in cleansing and washing operations, in chemical processes, such as paper making and water treating, and in the formulation of products in which silica and alkali are employed. The products also are very useful for a number of specific industrial uses where alkali, that is, sodium oxide and silica are required in balanced proportions. For instance, in the usual washing process, a high sustained alkalinity is desirable. The effective alkalinity in a washing bath is reduced in proportion to the bicarbonate content of the water supply, and in proportion to the soil which is introduced into the bath during the washing. The products of this invention are better than those that have been available in that they furnish the degree of effective alkalinity which is requisite for maximum detergent action, and the presence of silica with the high degree of alkalinity reduces the possibility of alkali damage.

An important feature of the invention is the dust-free nature of the products whether they be in flake, crushed or granular form. The dust which is formed in the handling of the stronger alkalies, such as caustic soda, soda ash and anhydrous alkaline materials is very irritating to the skin, the membranes of the nostrils, and the eyes and face; special precautions are taken, masks and special clothing are worn by the workmen handling these substances. Though the products of the invention may be more alkaline and hence more caustic than some of these other conventional materials, still the presence of the water of hydration in them, and the general physical nature of them precludes the formation of dust. Consequently the materials may be handled much more easily and with less danger of injury to the workmen than the other substances.

On the other hand, by virtue of the fact that the products are hydrated, they dissolve much more easily and much more quickly than anhydrous or substantially anhydrous silicate substances, even of equal alkalinity. In general, the products dissolve in one-half to one-third the time required for dissolving other water soluble silicates. There are substantial savings in time gained in the preparation of large quantities of washing solution, or in the preparation of small quantities of the solution at repeated intervals, as in the laundry operations or in the cleansing of machine parts.

Despite the fact that they are hydrated, and despite the fact that water of hydration always has been associated with instability, the products are stable and do not tend either to decompose or cake, i. e. agglomerate into rock-like masses, when they are stored under the usual factory or plant conditions in the usual containers. In fact, the stability of these products is equal to, if not greater than, that of ordinary caustic soda, so that the usual difficulties attending agglomeration or caking are avoided.

In the physical form, the products may be granular, in chips, or in flakes, not unlike soap flakes in character. These chips and particles have a structural stability which prevents them from breaking into fine dust-like particles when they are shipped; even the finely ground products are substantially free from dust.

To assist those skilled in the art in the manufacture of the products of the invention the following examples are provided:

EXAMPLE 1

*Preparation of hydrated sodium orthosilicate, $Na_4SiO_4.6.1H_2O$ from sodium metasilicate*

To sodium metasilicate liquor $(Na_2SiO_3.5H_2O)$ at a temperature of approximately 70–75° C., caustic soda (76% lye flake) is added in the following proportions:

| | Parts by weight |
|---|---|
| Metasilicate liquor | 200 |
| Caustic soda (76% lye flake) | 76.9 |

The size of the batch preferably should be such that not much longer than one minute is required for the actual addition of the caustic. The dissolution should be carried out with stirring. About three to four minutes are required for the complete solution of the caustic soda. This product, drops of which are substantially clear and transparent, constitutes the established ortho liquor, which is stable in the liquid phase for approximately eight to ten minutes. Within this time the established ortho liquor is heated to a temperature between 100–150° C. for thermal crystallization of the mass, as hereinafter more fully described.

EXAMPLE 2

*Preparation of the composition, $1.75Na_2O.1SiO_2 5.8H_2O$, from sodium metasilicate*

To 200 parts by weight of sodium metasilicate liquor, $(Na_2SiO_3.5H_2O)$, at a temperature of approximately 70–75° C. are added 57.7 parts by weight of caustic soda (76% lye flake) with stirring. The caustic soda dissolves completely after stirring from three to four minutes. The solution is then heated promptly, without further stirring, to a temperature between 100–150° C., as in Example 1.

EXAMPLE 3

*Preparation of the composition, $2.25Na_2O.1SiO_2.7H_2O$, from sodium metasilicate*

In the manner described in Example 1, 200 parts by weight of sodium metasilicate liquor $(Na_2SiO_3.5H_2O)$ 10.8 parts by weight of water and 96.2 parts by weight of caustic soda (76% lye flake) are dissolved together and then thermally crystallized as hereinafter described.

EXAMPLE 4

*Preparation of sodium orthosilicate, $Na_4SiO_4.6H_2O$, from sodium sesquisilicate crystals*

In the manner of procedure described in Example 1, 32.5 parts by weight of caustic soda (76% lye flake) are dissolved in 200 parts by weight of sodium sesquisilicate crystals $$(3Na_2O.2SiO_2.11H_2O)$$

which has been melted to a liquid condition, the temperature of which is adjusted to approximately 70–75° C. Crystallitic solidification is caused to take place in the method hereinafter more fully described.

EXAMPLE 5

*Preparation of sodium orthosilicate, $Na_4SiO_4.6H_2O$, from 60° Baumé silicate of soda (waterglass)*

Silicate of soda of 60° Baumé, which is the preferred starting point according to this example, has a molecular ratio of $1Na_2O$ to about $1.93SiO_2$. The following analysis is typical of this grade:

| | Per cent |
|---|---|
| $Na_2O$ | 18.7 |
| $SiO_2$ | 35.0 |
| $H_2O$ | 46.3 |
| Total | 100.0 |

According to this method of establishing "ortho liquor," 141.1 parts by weight of caustic soda (76% lye flake), the preferred source of $Na_2O$, is dissolved in 200 parts by weight of the 60° Baumé silicate of soda at about atmospheric temperature. In establishing the solution it is preferred to dissolve first approximately 46 parts by weight of the caustic soda with stirring in the silicate of soda at room temperature. The solution of this amount of alkali takes place within a few minutes, and is accompanied by a rise in temperature. Next, the temperature of the solution thus provided preferably is adjusted to approximately 70–75° C., and the remainder of the caustic soda (about 95.1 parts by weight) is added, with stirring. The remainder of the procedure is as described in Example 1.

EXAMPLE 6

*Preparation of sodium orthosilicate, $Na_4SiO_4.6.5H_2O$, from sodium metasilicate*

Proportions:

| | Parts by weight |
|---|---|
| Metasilicate liquor $(Na_2SiO_3.5H_2O)$ | 200 |
| Water | 7 |
| Caustic soda (76% lye flake) | 76.9 |

Ortho liquor is established by the mixing and preparation of these components in the manner of Example 1. Crystallitic solidification is conducted as hereinafter described.

Example 7

*Preparation of the composition, $2.25Na_2O.1SiO_2.7.2H_2O$, from 58.8° Baumé silicate of soda (waterglass)*

The preferred starting point according to this example is 58.8° Baumé silicate of soda which has a molecular ratio of about $1Na_2O$ to $1.63SiO_2$. The following analysis is typical of this grade:

| | Per cent |
|---|---|
| $Na_2O$ | 19.4 |
| $SiO_2$ | 30.6 |
| $H_2O$ | 50.0 |
| Total | 100.0 |

The ortho liquor is established in this example by dissolving 136.2 parts by weight of caustic soda (76% lye flake) in 200 parts by weight of 58.8° Baumé silicate of soda at a temperature of 30–40° C. The caustic soda should be dissolved by stirring. The ortho liquor thus established is heated promptly to a temperature between approximately 100–150° C., for thermal crystallization in the manner hereinafter more fully described.

Example 8

*Preparation of the composition, $1.9Na_2O.1SiO_2.5.98H_2O$, from sodium metasilicate*

Proportions:

| | Parts by weight |
|---|---|
| Metasilicate liquor ($Na_2SiO_3.5H_2O$) | 200 |
| Caustic soda (76% lye flake) | 69.2 |

These components are mixed and prepared in the manner of Example 1.

It will be understood by those skilled in the art that the numerical values given in the foregoing examples are not precisely critical.

In following these examples, it may seem peculiar and illogical to attempt the dissolution of such large quantities of caustic soda in the relatively small amounts of liquid silicates indicated, when the liquids already are relatively thick and viscous. The solution takes place quite promptly however, and the final solid products exemplify the characteristics of solid solutions in that droplets of the established ortho liquor, from which they are made, are clean and substantially clear and transparent, and solidify under the influence of heat to hard crystallitic stable bodies. Usually, some stirring or agitation is necessary in establishing the "ortho liquor," but the time intervals involved are not so short as to hamper or prevent successful practice of the invention under large scale industrial methods of production.

The final products, which have been thermally crystallized in the manner hereinafter more fully discussed, are white, stable, crystallitic compounds which dissolve rapidly in water and leave no residue. In the present disclosure the term "stability" is used to denote a condition which is characterized by the absence of deleterious, physical or chemical change. The products of the invention do not cake together, become agglomerated, or change physically so as to become impossible to pour, or handle conveniently, and it is in this sense that the term "stable" is used.

Thermal solidification

The process of thermal crystallization enables the liquid silicate composition to be converted easily into a solid of like composition.

One method of thermally crystallizing the "ortho" liquor which has been prepared is to pour established ortho liquor onto heated rolls, then remove the final product from the rolls in the form of flakes of the type of soap chips, or flakes of mica. In this form, a highly alkaline and useful, stable chemical is provided. The flakes are relatively brittle, they may vary considerably in thickness to suit the particular characteristics desired, and are unique in view of the fact that they dissolve in water extremely rapidly, yet are not particularly deliquescent.

Another method of effecting the thermal crystallization of the liquor is by the spraying of the liquor into a heated chamber, relatively promptly after the liquor has been prepared. In this instance, thermal crystallitic solidification is accomplished in a heated zone during the flight of the atomized particles of liquor through the zone. The temperature of the zone in such instances may be in the neighborhood of 125 to 175°, or more, in accordance with the nature and the size of the particles atomized and the permitted length of travel through the zone. The atomizing of a liquor into a heated chamber involves a relatively simple technique, well understood by those skilled in the art. It may be mentioned that an atomizing nozzle, made of Monel metal or like material which is resistant to alkali attack, is suitable. The final product is a powdery, granular, free flowing mass.

On the other hand, I have found also that thermal crystallization may be caused to take place with satisfactory results by the casting of the established ortho liquor into ordinary casting pans, accompanied with a heating of the pans to a temperature of around 150° C. In this method, it is recommended that the layers of liquid be not substantially over one inch in thickness, otherwise proper heat transfer into the interior part of the layer is difficult. In the casting method, hard cakes are provided in a few minutes time and the cakes, after they have cooled, are crushed and screened in the usual manner. The products may be passed through a dry heated zone, if it is desired to reduce the degree of hydration, for example, say from 6 waters more or less to, say, 5 waters more or less. Complete dehydration of the products is possible by continued heating of them, but the products do not exhibit the usual low temperature melting points, which are characteristic of other silicate hydrates; in fact the products do not melt or liquify once they have been crystallized until they are heated to a temperature well above 2000° F.

A further process for making the products of the present invention is disclosed in my copending application Serial No. 226,988 entitled Method of making hydrous sodium silicates.

A peculiar lamellar crystal structure sets up in cast cakes. When the cakes are crushed or struck, flat tabular fragments which are quite analogous to fragments of mica or slate, are provided. In some instances, the interfaces of the flat fragments appear to be slightly moist with exuded liquid. It is not known at the present time whether this liquid represents the excess water (containing dissolved solid matter), remaining after hydration of the crystals, or whether it represents liquid mechanically exuded during crystallization. This moisture quota, however, when it is present, does not disturb the stability of the granules produced from the crushed solids and is removed readily, in any convenient manner, mechanically or by evaporation.

From the strict, academic point of view, the evidence which is available indicates that the compositions of the present invention exhibit all the behavior of true chemical compounds. The Laue pattern which the products display upon being subjected to X-rays are individual to the new products and do not, as is the case with ordinary mechanical mixes, correspond simply to the line patterns of the alkali superposed over the line patterns of the base silicate. Also, the line patterns are clear and sharp, which is contrary to the result when amorphous materials are subjected to X-ray scrutiny.

Having described my invention, I claim:

1. A stable, hydrous sodium silicate containing from approximately 1.75 to 2.25 molecular parts of sodium oxide to each molecular part of silicon dioxide and containing approximately 5-7 molecules of water as water of hydration, and exhibiting a diffraction pattern when exposed to X-rays according to the method of Laue consisting of 5 dominant rings, in which the outermost ring has a diameter of $x$ and the rings successively smaller than $x$ have respective diameters of $.91x$, $.73x$, $.63x$ and $.39x$.

2. A new composition of matter comprising, a stable, hydrous sodium silicate in the form of flakes which, when subjected to X-rays through a pin-hole according to the method of Laue, exhibit a diffraction pattern consisting of 5 dominant rings the largest ring having a diameter of $x$ and the successively smaller rings, having respective diameters of $.91x$, $.73x$, $.63x$ and $.39x$.

3. Stable, hydrous silicate of soda containing approximately 2 molecular parts of alkali metal oxide to one molecular part of silicon dioxide and about 5-7 molecules of water as water of hydration, specimens of which composition, when subjected to X-rays through a pin-hole according to the method of Laue, provide an X-ray diffraction pattern consisting of 5 dominant rings, the outermost of which has a diameter of $x$ and the successively smaller rings have diameters respectively of $.91x$, $.73x$, $.63x$ and $.39x$.

4. Stable, hydrous sodium orthosilicate in the form of flakes which, when exposed to X-rays through a pin-hole according to the method of Laue, provide an X-ray diffraction pattern displaying 5 dominant rings of respective diameters of $.91x$, $.73x$, $.63x$, $.39x$ and $x$ units in diameter, $x$ being the diameter of the outermost dominant ring.

GEORGE R. McDANIEL.